United States Patent [19]

Williams

[11] Patent Number: 4,592,043
[45] Date of Patent: May 27, 1986

[54] WAVELENGTH DIVISION MULTIPLEXING OPTICAL COMMUNICATIONS SYSTEMS

[75] Inventor: Gareth F. Williams, Aberdeen, N.J.

[73] Assignee: AT&T Bell Laboratories, Murray Hill, N.J.

[21] Appl. No.: 603,405

[22] Filed: Apr. 24, 1984

Related U.S. Application Data

[63] Continuation-in-part of Ser. No. 511,873, Jul. 8, 1983, abandoned.

[51] Int. Cl.$^4$ .............................. H04J 1/00; H04B 9/00
[52] U.S. Cl. ........................................ 370/3; 350/96.15
[58] Field of Search ..................... 350/96.15, 96.16; 370/3; 356/350, 352

[56] References Cited

U.S. PATENT DOCUMENTS 4,466,694  8/1984  MacDonald ................. 350/96.19
4,469,397  9/1984  Shaw et al. ................. 350/96.15

Primary Examiner—Joseph A. Orsino, Jr.
Attorney, Agent, or Firm—Richard D. Laumann

[57] ABSTRACT

A wavelength division multiplexing optical communications system and components thereof capable of using as many as $10^4$ channels are described. The system uses a waveguide resonator which is evanescently coupled to an optical fiber or waveguide. There is also an intracavity element optically coupled to the waveguide resonator and the control circuit element which is capable of tuning the frequency of either the intracavity element or the waveguide resonator, or both, to specific frequencies. There may be a plurality of devices optically coupled to each other through the system waveguide to form an optical communications system.

92 Claims, 17 Drawing Figures

WAVELENGTH DIVISION MULTIPLEXING OPTICAL COMMUNICATIONS SYSTEMS

CROSS REFERENCE TO RELATED APPLICATION

This application is a continuation-in-part of my copending application, Ser. No. 511,873, filed July 8, 1983, now abandoned.

TECHNICAL FIELD

This invention relates generally to wavelength division multiplexing optical components and systems and particularly to optical communications and switching systems using such multiplexing systems and to components thereof.

BACKGROUND OF THE INVENTION

In recent years, there has been an increased demand for high capacity communications systems and although several alternative approaches to such systems have been explored, optical communications systems now appear to be the preferred approach to meeting such demand. Optical communications systems as presently contemplated have a light source and a photodetector which are optically coupled to each other by a glass transmission line. The glass transmission line presently has a silica based composition and is commonly referred to as an optical fiber. A light source commonly used in such optical communications systems is a semiconductor laser diode. Such optical communications systems have been developed to a high degree of sophistication and are now capable of rapidly transmitting large amounts of information over long distances. In most present day systems, only one such diode is used to transmit information on any individual fiber, and the diode should ideally operate with essentially a stable single frequency spectral output. Information is transmitted as the laser emits or does not emit light pulses thus forming a bit stream, and the photodetector receives or does not receive light pulses within predetermined time intervals.

The three primary contemplated markets for lightwave systems are transmission, loop plant and local area network systems. Transmission systems typically carry many calls between central offices. Loop plant systems as used herein means those which carry calls between central offices and customer premises. Local area networks carry calls between locations that are located on customer premises, e.g., between a computer and work station, and are useful for factory or office automation. Thus, a perhaps better term is private subscriber network.

However, still greater amounts of information can be transmitted if, for example, a plurality of light sources emitting radiation at different frequencies is optically coupled into a single optical fiber at the same transmitter location. Thus, there would be a plurality of bit streams at different frequencies. Such systems have been contemplated and are commonly called wavelength division multiplexing systems. In such systems, the photodetector component includes means to individually detect the separated frequencies or wavelengths, i.e., the photodetector has demultiplexing means.

Superficially, such a system appears analogous to a radio or microwave system using a plurality of transmitters, at one location, emitting at different frequencies and a plurality of receivers at another location. One might think that radio techniques could be directly applied to optical systems without significant change. However, this is not possible. Radio circuits are typically much smaller than the radio wavelengths and microwave circuits have dimensions comparable to microwave wavelengths. Optical multiplexers smaller than an optical wavelength are not likely given the resolution of present lithography used in device fabrication and would also be difficult to couple optical energy into and out of. Optical wavelength division multiplexing devices are thus larger than optical wavelengths and fundamentally different from radio and microwave systems.

It should also be appreciated that attempts to implement narrow band optical systems face fundamental stability and resolution problems not encountered in radio. Optical frequencies are approximately $10^5$ times greater than microwave frequencies, and both frequency stability and resolution must be $10^5$ times greater in narrow band optical systems than in microwave systems. Such stability has not been possible.

The subject of wavelength division multiplexing in optical communications systems is reviewed in an article by W. J. Tomlinson in *Applied Optics*, 16, pp. 2180–2194, August 1977. The systems described are typical and all have a multi-transmitter module at one end and a multi-receiver module at the other end. The systems are presently contemplated only for transmission systems. They are not easily adaptable for either loop plant operation or a local area network because the optical fiber is not easily tapped at arbitrary places without first detecting all the signals and then regenerating them. Individual components discussed are, however, illustrative. Multiplexing and demultiplexing means typically comprise either gratings, prisms, or filters. While these means are perfectly adequate for many multiplexing systems, they suffer the drawback that the number of channels that the system may handle is extremely limited because the wavelength dispersion of the demultiplexing means is not adequate to separate very closely spaced channels in devices of reasonable dimensions. A relatively large channel spacing is required because the optical bandwidth must be adequate to absorb the wavelength variability due to, for example, temperature, aging, and manufacturing, of present semiconductor lasers. Also, some of the multiplexing means have a relatively high fixed loss per channel. This also limits the possible number of channels.

Other wavelength multiplexers have been described in the literature. For example, frequency selective coupling means, i.e., evanescent couplers, have been proposed as an alternative to means that rely on dispersive properties of the multiplexer components. An evanescent coupler, in its simplest embodiment, uses at least two optical waveguides in such close proximity that the propagating mode of the second waveguide is within the exponentially decaying evanescent portion of the propagating mode of the first waveguide. The overlap couples optical energy into the second waveguide if the propagation constants, k, in the two guides are equal. If the values of k are equal at only a single frequency, only energy at that frequency is coupled while energy at other frequencies remains in the first guide. H. F. Taylor describes such a frequency selective coupling scheme in *Optics Communications*, 8, pp. 421–425, August 1973. The couplers described used optical coupling between two nonidentical waveguides to couple the single optical frequency for which the propagation constants in the two guides are equal. Optical bandwidths of approximately several tens of Angstroms could be achieved in 1 cm long couplers thus theoretically permitting about 100 optical channels. However, these bandwidths are too narrow for use with present semiconductor lasers. There is also the problem of insuring that the multiplexer coupling frequency is accurately matched to the demultiplexer coupling frequency. However, with anticipated variations in, for example, manufacture, the narrow transmission bandwidth might not overlap the narrow reception bandwidth.

An interesting variant of this selective coupling scheme is described in *Applied Optics*, 17, pp. 3253-3258, Oct. 15, 1978. The system described used optical coupling between nonidentical planar waveguides to demultiplex the optical signals. While advantageously used for some applications, the coupler demultiplexers all lack a resonator component. This is disadvantageous because they need a light source having an extremely narrow spectral output.

In *Fiber and Integrated Optics*, 1, pp. 227-241, 1978, H. Kogelnik reviewed the subject of integrated optics. Multiplexing transmitter modules using distributed feedback semiconductor lasers are described. In one module, six distributed feedback lasers are fabricated on a single substrate and their outputs combined by a branching waveguide coupler. The manufacturing, temperature and drift variations of the lasers are identical, due to the single substrate, and a channel spacing of 20 Angstroms is possible. However, the problem of making a receiver which will match the transmitter frequencies as they drift still exists.

Other optical components suitable for use in an optical communications system, as well as other uses, have been described in the literature. For example, *Applied Physics Letters*, 33, pp. 940-941, Dec. 1, 1978, described a fiber gyroscope that has a fiber ring, not a Fabry-Perot, interferometer for electronic phase sensing.

In the *Bell System Technical Journal*, pp. 2103-2132, September 1969, E. A. J. Marcatili describes light transmission through curved optical waveguides. Of special interest from the point of view of optical communications systems is the ring Fabry-Perot interferometer depicted in his FIG. 1. However, the embodiment depicted is not well adapted for wavelength division multiplexing systems as the resonator shown picks out radiation at many frequencies without a significant amount of discrimination between the various frequencies. That is, the resonator is unable to discriminate between the multiplicity of Fabry-Perot peaks of the resonator. Another device of general interest is the integrated linear Fabry-Perot resonator described by Smith et al in *Applied Physics Letters*, 34, pp. 62-65, Jan. 1, 1979. The device described required no external electrical inputs and used only optical outputs. The use contemplated was in bistable optical devices.

Thus, the typical prior art wavelength division multiplexing systems use a very wide optical bandwidth to accommodate the frequency variations of semiconductor lasers and the total number of channels is very limited. Some narrower bandwidth system components were demonstrated, for example, frequency selective evanescent couplers, but have not been used in systems because of the absence of a precise narrow bandwidth source and the difficulty in matching transmitter and receiver bandwidth's center frequencies. Additionally, the systems are not easily adapted for loop plant or local area network operation.

SUMMARY OF THE INVENTION

I have found that a wavelength division multiplexing systems may be fabricated which can handle a large number of optical channels, for example, $10^4$. The optical communications system comprises an optical fiber or waveguide and a device comprising a photodetector; a waveguide resonator that is evanescently coupled, or capable of being coupled, to the optical fiber or waveguide and optically coupled to said photodetector; an intracavity element optically coupled to said waveguide resonator; and a control circuit element which tunes either the intracavity element or the waveguide resonator, or both, to specific frequencies. In one embodiment, the system comprises a plurality of devices which may be optically coupled to the system's fibers at any place. The devices are indpendently tunable thereby permitting a signal having a desired frequency to be either received or transmitted. Additionally, the devices perform frequency selective coupling from the fiber to the transceiver and thereby couple to the desired optical channel frequency, yet have negligible attenuation of the undesired channels remaining in the fiber or waveguide. This permits a signal having a desired frequency to be received with negligible attenuation of unwanted signals at other frequencies. An optical gain element in the resonator or coupled to the resonator yields a device which can transmit thereby permitting transmission of a signal in the optical fiber at a desired frequency. In one embodiment, the waveguide resonator comprises an optical fiber loop which is coupled to the optical fiber. The intracavity element may comprise an optical fiber loop coupled to the main Fabry-Perot resonator or it may comprise a waveguide Mach-Zehnder interferometer or a three coupler waveguide Mach-Zehnder interferometer or a wavelength selective coupler. In a further embodiment, the control circuit element further comprises link initiation and maintenance means. In yet other embodiments, other resonators, such as linear or pillbox resonators, may be used. Other intracavity elements, such as linear resonators, or a wavelength selective coupler may also be used. Grating or acousto-optic assisted wavelength selective weak coupling from resonator to system fiber or waveguide may also be used.

Hierarchical systems may also be implemented thereby greatly increasing the number of channels.

For reasons of clarity, the elements of devices and systems according to this invention are not drawn to scale.

DETAILED DESCRIPTION

Figure 1:
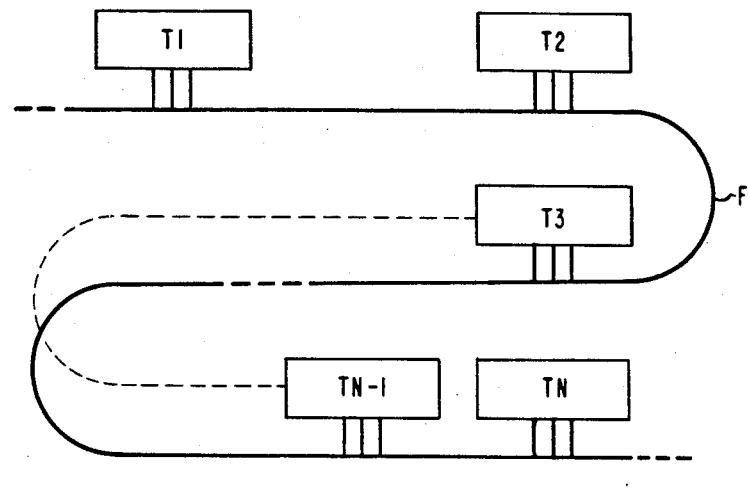
FIG. 1 is a schematic representation of an optical communications system according to this invention.

A wavelength division multiplexing system according to this invention is schematically depicted in FIG. 1. The system comprises a plurality of transceivers indicated as T1, T2, etc., TN-1, TN, which are optically coupled to an optical transmission line, F. The optical transmission line, commonly referred to as an optical fiber, has characteristics that are well known to those skilled in the art and need not be described further in detail. It comprises a high refractive index core surrounded by a low index cladding. It should preferably be a single mode optical fiber which may also be a single polarization optical fiber or polarization preserving optical fiber. Although the system and its components will be described by reference to an embodiment using an optical fiber, it will be understood by those skilled in the art that a fiber is only one type of waveguide and that other types, e.g., planar waveguides, may also be used. The terms core and cladding refer to the high and low refractive index regions, respectively, of the waveguides. The transceivers comprise both transmitter and receiver modules. The transceivers are independently tunable to common frequencies and thus may be coupled to each other when, for example, the receiver module of a first transceiver is tuned to the frequency of the transmitter module of a second transceiver. For a complete two way link, the receiver module of the second transceiver is tuned to the frequency of the transmitter module of the first transceiver. The transmitter and receiver modules are optically coupled to the system fiber by evanescent field coupling as described in detail later. The number of transceivers is not critical and may be as large as, or even larger than, the number of optical channels.

Each transceiver may also include its own independent local control system which performs functions such as tuning, internal optical alignment, link initiation and maintenance, plus system functions. Each transceiver can be independently coupled to the optical transmission line anywhere along the length of the line and this system may thus be used for loop plant and local area network applications as well as transmission applications. The tunability permits any transceiver to communicate with any other transceiver thus performing a switching function. This is useful in, for example, loop plant applications for communications between customers and factory automation local area networks where the robots or computers would be able to communicate directly with any other robot or computer or in office automation applications. Switching systems may also be realized by this multiplexing technique. These control systems typically comprise a stored program machine, e.g., a microprocessor. The algorithms and routines described later define control system programs or subroutines. Some high speed functions, e.g., alignment searches, are preferably implemented using random logic. Separate control functions, e.g., transmitter and receiver control systems, may comprise separate processors or time shared processes on a common processor. Implementation may be by any of several techniques well known to those skilled in the art.

Figure 2:
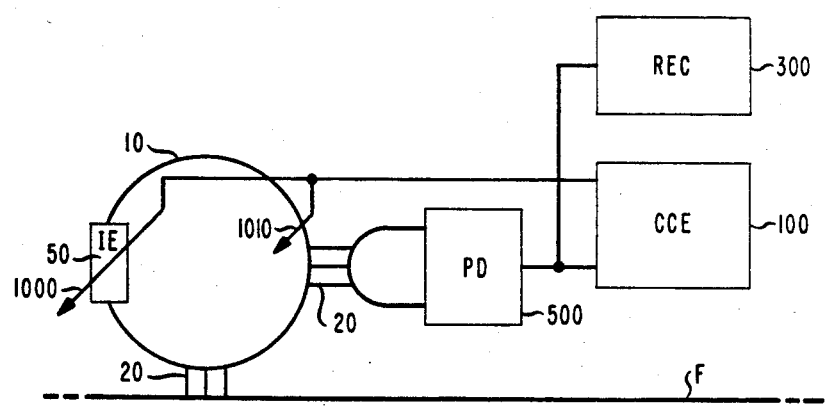
FIG. 2 is a schematic representation of an optical receiver module of a system according to this invention.

FIG. 2 is a schematic representation of a receiver module of a transceiver as depicted in FIG. 1. The receiver comprises a main resonator guide 10 which further comprises an intracavity dispersive loss element (IE) 50. There is also a photodetector (PD) 500, a control circuit element (CCE) 100 and a receiver (REC) circuit 300. The control circuit element is connected to the photodetector 500, main resonator guide 10, the dispersive loss element 50, and the receiver 300. The main resonator guide is optically coupled to both the optical fiber and photodetector by evanescent coupling means 20. The control circuit provides means, as indicated by arrows 1000 and 1010, to tune the main resonator guide and the intracavity element to desired frequencies. The receiver circuit takes the electrical signal from the photodetector and recovers the information from the signal. The photodetector and resonator may be evanescently coupled through other means of optical coupling may also be used.

Figure 13:
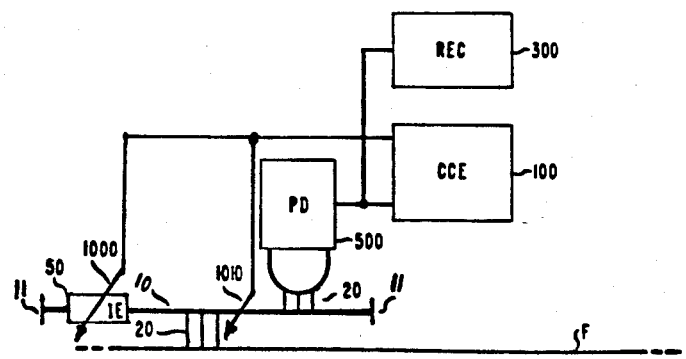
FIG. 13 is a schematic representation of an optical receiver module of a system according to this invention using a linear resonator.

Although the main resonator guide is depicted as being a loop, it is to be understood that other resonator configurations are contemplated. For example, linear and pillbox resonators are also contemplated. An exemplary embodiment of a receiver using a linear resonator is depicted in FIG. 13. The embodiment is identical to that depicted in FIG. 2 except that the main resonator guide comprises a linear, rather than a loop, resonator. Identical numerals represent identical elements. The end mirrors are indicated as elements 11. It can be noted that a pillbox resonator is a special case of a loop resonator in which the ring shrinks, i.e., the ring diameter is shrunk, until the center hole vanishes.

The tunability of the resonator is desirable because it enables the frequency of the receiver resonator to be matched to the frequency of the transmitter by the control sytem. The tunability may be accomplished by, for example, varying the effective optical length of the resonator by means such as the electro-optic effect or mechanical strain. This moves the Fabry-Perot resonances. It is often desirable that most of the power from the channel selected be coupled to the detector. For this is to be accomplished, the system guide to resonator coupling should approximately equal the detector to main resonator guide coupling.

The intracavity dispersive loss element 50 is frequency dependent and selects a single Fabry-Perot resonant peak of the main resonator by spoiling the Q of the cavity at other resonances. Two conditions must be satisfied at the main resonator cavity resonance. First, the intracavity element loss must be a minimum and, second, the cavity must be at one of the Fabry-Perot resonances, i.e., there must be an integral number of optical wavelengths per main resonator cavity round-trip. The resonator is typically very weakly coupled to the system waveguide, that is, the optical fiber, to avoid any appreciable coupling to undesired channels. The high cavity Q, typically $10^2$, resonantly enhances the coupling of the desired signal and even a small loss eliminates unwanted resonances. For example, a 10 percent loss at the first unwanted resonance is typically sufficient. The intracavity element transmission peak can be relatively broad because it is effectively sharpened by the intracavity resonance. However, the peak loss must be low to avoid spoiling the main cavity Q at the desired resonance. The control circuit also aligns the transmission peak of the intracavity loss element with the cavity resonance selected. Tuning means 1000 varies the appropriate optical path length. The two must be servoed simultaneously to tune the receiver frequency to the desired transmitter. As will be explained later, after this has been accomplished, the receiver must servo to follow the transmitter selected.

The receiver module comprises a control circuit element which uses the output of the photodetector 500 to servo the tuning means 1010 to align one of the main resonator Fabry-Perot resonances with a desired optical signal. It may further servo tuning means 1000 to align the intracavity element 50 to select the resonance aligned with the desired signal.

The operation of the main resonator guide may be better understood from the following discussion. The operation of the resonator may be easily understood by considering the analogy with a conventional discrete optics Fabry-Perot interferometer which has two 99 percent reflecting and 1 percent transmitting mirrors which are parallel to each other and separated by a distance, d, to form a resonant cavity. If a beam of monochromatic light is now incident upon one of the mirrors, initially 1 percent of the beam power, that is, 10 percent of the electric field, will be transmitted into the cavity and 99 percent of the power will be reflected. The light inside the cavity travels to the other or output mirror and is reflected back toward the input mirror where it is again reflected. If the roundtrip length, $2d$, is exactly an integral number of wavelengths, the reflected wave will add in phase with the input light and interfere constructively. As a result, the cavity field is now approximately 0.2 times the incident field and the cavity power is approximately 0.04 times the incident power. After the next roundtrip, the field is approximately 0.3 times the incident field and the cavity power is approximately 0.09 times the incident power. Eventually, the resonant cavity power is approximately 99 times the incident power and the 1 percent leakage out the input mirror is exactly 180 degrees out of phase with the 99 percent reflection for the incident beam. The two cancel by destructive interference and leave essentially no reflected power. The 1 percent leakage of the 99 times incident power resonator wave at the output mirror gives a transmitted beam of essentially the same power as the incident beam. Thus, if the Fabry-Perot resonator is tuned exactly for the wavelength of the incident beam, that is, if $2d=n\lambda$, the incident beam is transmitted directly through the Fabry-Perot cavity in the steady state. However, the Fabry-Perot transmission peak is exceedingly narrow in wavelength because the cavity light must remain in phase with the input light over many cavity roundtrips to build up a large cavity resonant power. As will be appreciated, the relatively long build-up time of the cavity power also reflects the narrow bandwidth achievable. For example, a pulse short compared to the resonator round trip transit time will be rejected as its frequency spectrum is too broad.

The loop Fabry-Perot main resonator guide is analogous. The weak evanescent couplers correspond to the input and output mirrors and the resonant condition is the requirement that there be an exactly integral number of wavelengths around the loop. If there is monochromatic light being transmitted through the system fiber, it will be incident on the evanescent coupling means to the main resonator guide. Initially most of the energy will pass by and only a fraction is coupled into the resonator. However, as has been explained, if the incident light has a component at a resonant frequency, a large resonant wave at the resonant frequency will eventually build up inside the loop and the resonant power coupled back to the system waveguide then cancels most of the incident power of that frequency remaining in the system guide. The resonant power coupled to the detector unit is typically most of the intensity originally incident in the system waveguide or fiber. The weakness of this evanescent coupling means further ensures negligible coupling to and, therefore, negligible attenuation of other, off-resonant, optical channel frequencies. The operation of the linear and pillbox resonators are similar and will now be understood by those skilled in the art.

However, the receiver bandwidths are sufficiently narrow as compared to the optical carrier frequency that a control system should generally be used to provide frequency stabilization. It is also apparent that a simple loop resonator has multiple, regularly spaced resonances as do all Fabry-Perot resonators. If the desired resonance has n wavelengths per cavity roundtrip, the next higher frequency resonance has n+1 and the next higher n+2, etc. The spacing between the peaks is called a "free spectral range" (FSR). The intracavity element is used to select the single desired Fabry-Perot peak by spoiling the loop Q at the unwanted resonances.

Evanescent couplers are typically used for both the input and output coupling to the main resonator guide as well as in some applications which will be discussed later. An evanescent coupler comprises two waveguides in such close proximity to each other over part of their length that the propagating modes in the two waveguides overlap. This overlap couples energy between the two guides. It should be noted that the two waveguides cores typically need not touch each other because the propagating mode is not confined to the core. Outside the core, the mode comprises an evanescent wave which typically decays exponentially in distance from the core. The principal coupling overlap is then between the evanescent tails of the propagating modes in the two guides. For broad band coupling, $k(\omega)$ should be approximately equal in the two waveguides. $\omega$ is $2\pi f$, where f is the frequency.

When the two waveguide cores touch each other, the structure is often alternatively termed a Y-coupler. It should also be noted that, although an evanescent resonator output coupler is usually preferred, any reasonably efficient waveguide to detector coupling means may be used.

Figure 12:
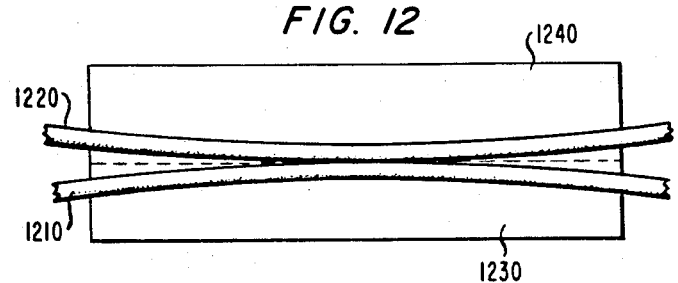
FIG. 12 is a schematic representation of an evanescent coupler.

An exemplary evanescent coupler is depicted in sectional view in FIG. 12. It comprises two blocks 1230 and 1240 fabricated from, for example, glass or plastic, having grooves cut within them into which two optical fibers 1210 and 1220, respectively, are inserted. Each fiber follows a curved path, as shown, and is embedded at the edges of the block but rises to the surface near the center of the block. The fibers are curved to diverge from the coupling region to facilitate their handling and coupler fabrication. The blocks are polished so that a portion of the fiber cladding is removed near the center of the block where the fiber rises to the surface. The blocks are then placed together to form a complete coupler. An index matching optical cement may be used to hold the blocks together and to thereby improve the coupling and reduce scattering loss.

Evanescent couplers between two integrated optic waveguides may be made simply by fabricating the two waveguides close together on a common substrate.

Figure 3:
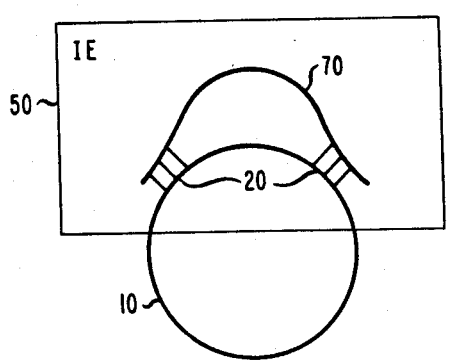
FIGS. 3-5 are schematic representations of several embodiments of an intracavity element design useful with an optical receiver or optical transmitter module of a system according to this invention.
Figure 4:
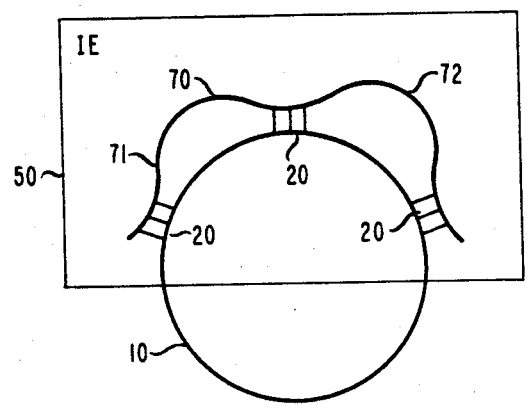
Figure 5:
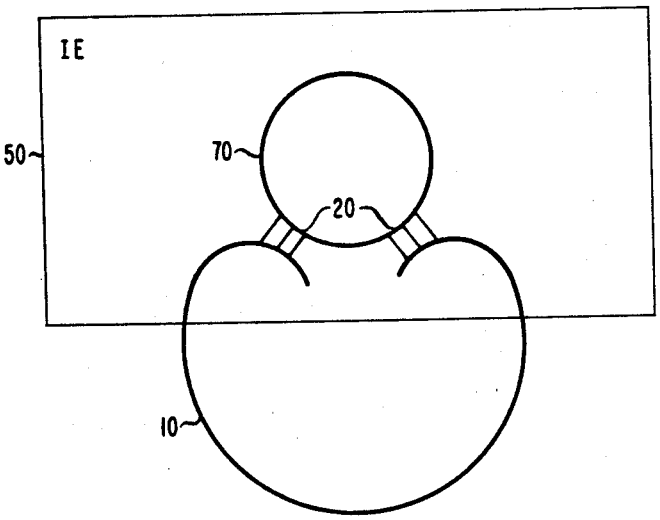

FIGS. 3-5 are schematic representations of several embodiments of an intracavity element (IE) design according to this invention. The intracavity elements fall into one of at least three preferred general categories. The first category comprises the Mach-Zehnder IE such as those depicted in FIGS. 3 and 4. FIGS. 3 and 4 depict, respectively, two and three coupler Mach-Zehnder IEs.

Figure 9:
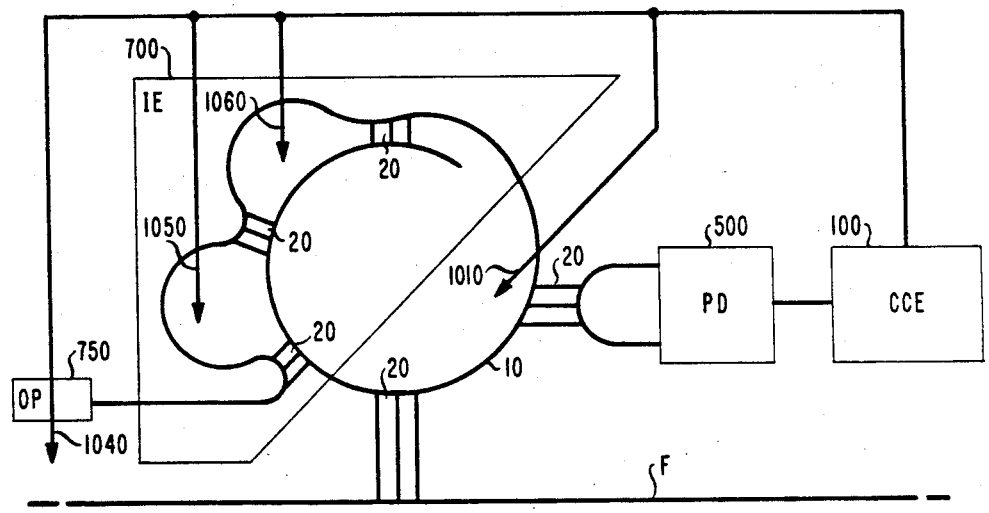
FIGS. 9-11 are schematic representations of several embodiments of an intracavity element design useful with an optical transmitter or optical receiver module of a system according to this invention.

In the two-coupler Mach-Zehnder IE, the resonant wave is split between the two guides 10 and 70 at the first coupler and the two parts travel different paths i.e., different optical path lengths, to the second coupler. If they arrive in phase at the second coupler, all of the power is returned to the main resonator guide. If they do not arrive in phase, some remains in the second guide and is lost. A disadvantage of the two-coupler IE is the requirement that the two couplers 20 be of exactly the same coupling strength. This disadvantage is removed with a modified Mach-Zehnder three coupler embodiment depicted in FIG. 4 in which the second guide 70 comprises loops 71 and 72. This avoids matching the coupling strengths i.e., the coupling strengths need not be exactly matched and furthermore has extra selectivity. It should be noted that the two loops of the three-coupler embodiment are each characterized by their own free spectral range and the receiver module control circuit element therefore has an extra alignment requirement. Tuning is achieved in both by varying the optical path length of the Mach-Zehnder loops by, for example, mechanical strain or electro-optic means. An alternative three-coupler design will be discussed later with respect to FIG. 9. The two-coupler version of FIG. 3 is the waveguide analog of the discrete optic Mach-Zehnder interferometer. See, for example, Born and Wolf, *Principles of Optics,* 4th edition, pp. 312-315, 1970. The IE transmission peaks occur when the difference in the optical path lengths is an integral number of wavelengths. The three-coupler embodiment is presently preferred because of simplicity of fabrication and selectively. As shown, guide 70 is coupled to the main resonator 10 by evanescent coupling means 20. It should be noted that complete decoupling between guides 10 and 70 is not required and may be difficult to obtain in integrated optics embodiments. It should also be noted that in integrated optics embodiment, decoupling between guides 10 and 70 may be achieved either by changing the physical separation of the two guides or the composition or dimensions of at least one guide so that the propagation constants are unequal except in the coupling regions. This also increases the optical path length difference. Other methods, such as decreasing the refractive index between the guides, may also be used.

Figure 15:
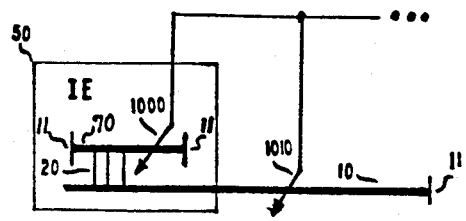
FIG. 15 is a schematic representation of a linear resonator intracavity element.

The second IE category comprises a resonator IE such as that depicted in FIG. 5. The loop resonator 70 is coupled to the main resonator by evanescent coupling means 20. The transmission peaks are at frequencies where there are an integral number of wavelengths per round trip. Although a loop resonator is depicted, it is to be understood that other resonators may be used. For example, pillbox or linear resonators may also be used. The pillbox resonator IE is similar to the loop resonator IE. FIG. 15 depicts an exemplary embodiment of a linear main resonator comprising an intracavity element using a linear resonator. Again, the end mirrors are indicated as elements 11. Depicted is linear resonator 70. However, a typical linear resonator IE is coupled to the main resonator guide by a single evanescent coupler and acts as a wavelength selective mirror. The linear resonator IE is typically used with linear main resonators, typically as a resonator end mirror.

Figure 6:
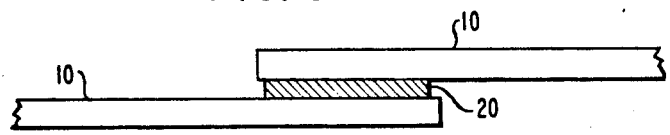
FIGS. 6-7 are schematic representations of evanescent coupling intracavity elements useful in this invention.
Figure 7:
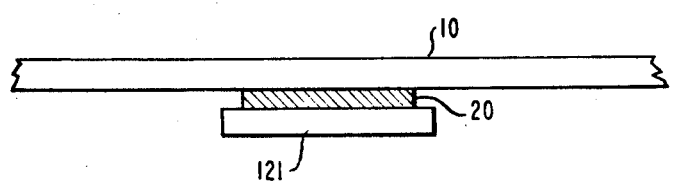

Evanescent coupler IEs are depicted in FIGS. 6 and 7. These are also potentially of interest, particularly in integrated optics embodiments.

FIG. 6 depicts a segment of an optical resonator having a main guide 10, the ends of which are coupled to each other by an IE comprising evanescent coupling means 20. For complete coupling, two conditions should be satisfied. First, the propagation constants in the two guides should be matched. They may be equal or the difference may be supplied by a grating. Second, the interaction length should be an odd integral multiple of the coupling length. This condition can be satisfied by using the well-known alternating $\Delta \beta$ technique or varying the coupling stength. The alternating $\Delta \beta$ coupler is a possible IE. A sharp frequency peak is not needed but a low peak loss is.

FIG. 7 depicts an IE in which the main waveguide 10 is coupled to a second waveguide 121 by evanescent coupling means 20. Versions of FIG. 6 or 7 with identical propagation constants in the two guides and multiple crossover lengths in the coupling region correspond to the no decoupling limit in the Mach-Zehnder IE. The apparent optical path length difference seen by the modes of the two coupled waveguides can be tuned electro-optically by separate electrodes on the two guides. It should be noted that these electrodes also reduce the coupling because the propagation constants are no longer equal. Although the maximum cross-coupling is then less than unity, it is not critical for the embodiment depicted in FIG. 7 although it does impose an extra loss in the embodiment depicted in FIG. 6. However, if these electrodes cover only the central portion of the evanescent coupler IE, full coupling occurs in the end portions of the coupling region where the propagation constants are equal. This corresponds to the two-coupler Mach-Zehnder IE. Alternatively, there may be a full coupling region followed by a set of phase shift electrodes which are, in turn, followed by a second full coupling region. This is followed by a second set of phase shift electrodes again followed by a third full coupling region. This embodiment corresponds to the three coupler Mach-Zehnder IE.

Additional embodiments of the configurations depicted in FIG. 6 and FIG. 7 with three or more guides are also contemplated. For example, the evanescent coupling means 20 in FIG. 6 may be replaced by an intermediate guide evanescently coupled along its length to the two ends of main guide 10. Additionally, in FIG. 7, a third waveguide which is analogous to the second waveguide 121 may also be coupled to main guide 10 along the same length as 121. Alternatively, the third guide may be coupled to the second guide 121. The apparent optical path lengths difference seen by the modes of the three coupled waveguides can be tuned electro-optically by separate electrodes on the three guides.

If the propagation constants in the two coupled guides have different frequency dependencies which intersect, that is, are equal at one frequency, the evanescent coupling peaks at the frequency. The IE configuration of FIG. 6 is then preferred over that depicted in FIG. 7. The peak coupling frequency may then be tuned by electro-optically varying the difference between the propagation constants in the two guides. This shifts the frequency at which they are equal. If necessary, a reversed $\Delta\beta$ technique may be used to ensure complete coupling at the desired frequency.

Alternatively, the coupling may be acousto-optic grating assisted, electro-optic grating assisted or static grating assisted. The configuration of FIG. 6 is again the preferred embodiment. The grating supplies the difference between the propagation constants in the two coupled guides. The acousto-optic grating assisted coupler may be tuned by varying the acoustic frequency. The electro-optic grating couplers may be tuned by varying the period of the electric field variation by, for example, using many electrodes to which spatially varying voltages of different periods may be applied. All three types may also be tuned by electro-optically varying the difference between the propagation constants in the two guides. The grating coupling strengths in the embodiment depicted in FIG. 6 may also be controlled to give an odd integral number of cross-over lengths in the coupling length, e.g., by varying the acoustic or electric field amplitudes. In a crystalline material, such as lithium niobate, where the TE and TM modes are not degenerate, the TE<—>TM evanescent couplers in which a grating is used to couple the TE modes of one guide to the TM modes in the other may also be used as a wavlength selective IE. The use of more than one IE in a resonator is also contemplated.

The resonator IEs are not presently as attractive as are the Mach-Zehnder IEs. However, the resonator IEs are of special interest for integrated optics embodiments because their potential extra loss penalty is more easily controlled. They also have sharper transmission peaks. Although this extra selectivity is often not needed in receivers, it may be useful in transmitters if oscillation in unwanted or parasitic modes becomes a problem. The drawbacks to resonator IEs include higher potential losses at the transmission peaks which are a lesser problem in integrated optics embodiments.

The reciever tuning will now be described for a main resonator for an exemplary embodiment with a two-coupler Mach-Zehnder IE. Assume the receiver will be tuned to a still higher frequency. The receiver bandwidth is defined by the main cavity resonance selected by the IE and this resonance is tuned upward in frequency by shortening the optical length of the main resonator guide. The IE peak frequency is servoed to follow by decreasing the path length difference by the same means. When the tuning has moved the main resonator guide resonance up by one free spectral range, the control system can step the main resonator back by one free spectral range thus leaving the IE unchanged. The next higher Fabry-Perot resonance is now aligned with the IE peak and the receiver pass band is unchanged by the stepback because the next higher Fabry-Perot peak is directly substituted for the original peak. When the frequency is tuned by another main cavity free spectral range, the control system executes yet another mode stepback. Similarly, when the IE has been tuned through one of its free spectral ranges, the control circuit element executes an IE stepback of one free spectral range. This tuning technique ensures that neither the main resonator nor the IE needs to tune significantly more than one free spectral range. To tune either through a free spectral range requires an optical path length change of only one wavelength. Thus, one obtains a very broad receiver tuning range with optical path length changes of only an optical wavelength.

When the receiver is initially turned on, the IE must be aligned with the main resonator guide Fabry-Perot peak. One way for alignment to be detected is for the receiver to be lined up on a trasmitter. Thus, an exemplary initial alignment search executed by the control circuit element assumes that at least one transmitter is operating and then executes a two-dimensional search over the main resonator guide free spectral range and the IE free spectral range. This is effectively a search over the entire system bandwidth. The step size in each direction is typically of the order of the free spectral range divided by the finesse so that any transmitter will be detected. Finesse is the ratio of the free spectral range to the full width at half maximum of the resonance. When a transmitter is detected, the alignment optimization/tracking routine is called to home in on the exact alignment. Once exact alignment is achieved, the overall system controller can begin data transmission.

The receiver tracks the transmitter while data is being passed. This is performed by an alignment optimization/tracking routine which is a two-dimensional optimization routine which continually varies both the MRG and the IE tuning so that they are aligned with the transmitter frequency. Typically, this is done by continually servoing both to maximize the received power. When either reaches the center of the tuning range within appropriate limits, a mode stepback is executed during the appropriate control interval. Other tuning limits are possible. Typically, the actual MRG or IE tuning limits would be set at a little more than plus and minus one half free-spectral range from the center of the tuning range so that mode stepbacks would be executed approximately once every free spectral range. Note that a mode stepback will interrupt the data stream and introduce errors unless the data as transmitted over the link contain periodic "control intervals" during which mode stepbacks, and other control functions, are executed.

A typical two-dimensional optimization routine increments and decrements the IE and MRG tuning in succession. The tuning change which gives the greatest increase in received power is adopted. The cycle is then repeated. If there is no increase in power, the tuning is left unchanged. The step sizes may be varied. For example, the step size may be reduced with close to the optimum for more precise alignment and increased when far from the optimum for faster tuning.

Dead spaces in the information stream which are useful for control intervals are expediently created by transmitting information at a rate faster than received from the user by the transmitter as well as data buffering at both transmitter and receiver. During control intervals when data is not transmitted, the receiver buffer empties and the transmitter buffer fills. During data transmission intervals, the transmitter buffer empties and the receiver buffer fills.

It should be noted that the receiver rejection of off-resonance optical channels is typically approximately the product of the main resonator guide to system fiber coupling times the main resonator guide to detector coupling. If both are approximately 1 percent couplers, the cross talk rejection is about $10^{-4}$. This is prefectly adequate for many applications but is not adequate for applications having extremely large numbers of channels.

However, this problem may be avoided by increasing the resonator Q and decreasing the coupling strength because the cross talk is proportional to the square of the weak coupling strength. An alternative solution is to implement an embodiment having two main resonator guides. The first resonator is coupled to the system fiber and the second resonator is evanescently coupled to the first resonator. The optical signal for the photodetector and signal recovery is taken from the second resonator. The first resonator must include an IE and the second resonator typically includes an IE although it need not. Any of the IEs previously discussed may be used. The first resonator typically further includes a monitor detector which extracts enough signal so that a single resonator receiver control system in the control circuit element can be used to run it. The second resonator is servoed to be aligned with the channel transmitted by the first resonator. This technique doubles the cross talk rejection in dB. A third possible solution uses a resonator IE and couples the detector to the IE resonator rather than the main resonator. A fourth solution uses tunable wavelength selective evanescent coupling from resonator to fiber. Acousto-optic assisted weak evanescent coupling is of particular interest for some integrated optic embodiments. It is noted that low acoustic powers are acceptable because strong coupling is not needed. Electro-optically tunable frequency selective weak coupling is also contemplated, e.g., using tunable couplers previously discussed as IEs.

Evanescent coupling between an optical fiber and an integrated optic (IO) resonator is not as easily implemented if the propagation constants are significantly different as they are with nonglass IO technologies. However, coupling may be obtained by using, for example, grating assisted coupling, as with a tunable acousto-optic weak coupling discussed above or electro-optic grating assisted coupling. A static grating may also be used if it includes Fourier coupling components over the operating bandwidth of the receiver or transmitter. One type of this grating is spatially chirped over the required coupling components. Alternatively, the segment of the system guide coupled to the resonator may be included in the integrated optic chip. This is an attractive alternative if several transceivers are fabricated together.

The polarization of the light should also be considered. If the receiver resonator is birefringent, the optical paths, hence optical resonances, differ for the two polarizations. The receiver will then couple to only one polarization of the incident signal. This potential problem often may be ignored because after several meters of stressed fiber, the polarization has typically become random, both in direction and in ellipticity due to the stresses caused by present cabling techniques. The problem may be ignored in many systems as is evident from the consideration of the following embodiment. Consider a short haul system with negligible fiber loss and an excess margin of 40 dB. The probability is small that both the ellipticity will return almost to zero at the receiver and that the polarization will be accurately perpendicular to that of the receiver, so that less than $10^{-4}$ of the power will be received. An alternative is to make the receiver polarization insensitive. Unstressed optical fiber is almost nonbirefringent. If bending birefringence is any problem in a loop resonator, it may be eliminated by compensating static stresses or by adding subsidiary loops. In some integrated optics receivers, the two polarizations might have to be tuned separately. Yet another solution is to use a polarization preserving fiber for the system fiber. This is perhaps the preferred embodiment for integrated optics receivers and can be use for fiber resonator receivers as well. In the latter case, the polarization preserving fiber typically would be used for the receiver and transmitter resonators as well.

Figure 8:
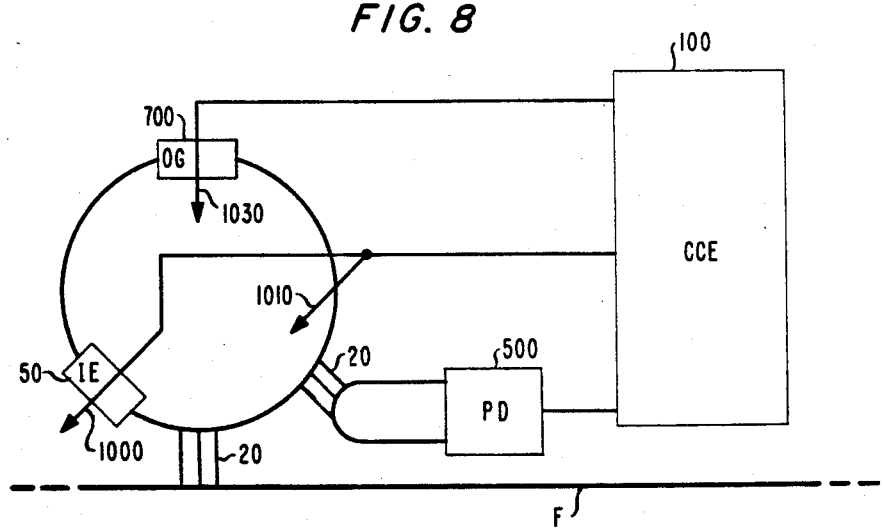
FIG. 8 is a schematic representation of an optical transmitter module of a system according to this invention.
Figure 14:
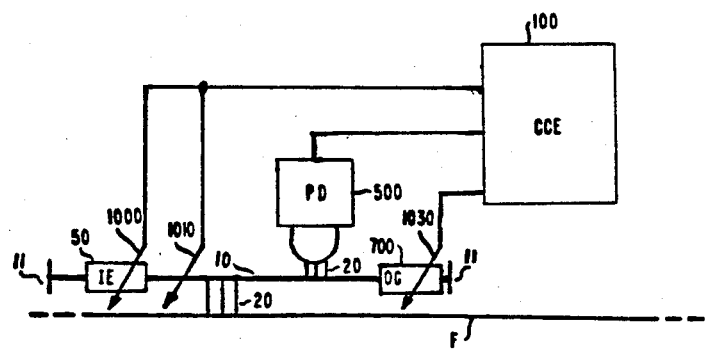
FIG. 14 is a schematic representation of an optical transmitter module of a system according to this invention using a linear resonator transmitter.

An embodiment of a transmitter according to this invention is depicted schematically in FIG. 8. The transmitter further comprises an optical gain element 700 in addition to the elements depicted for the optical receiver module. The addition of the optical gain element turns the main resonator into a laser with the particular lasing resonance being selected by the IE. Tuning means 1030 varies, in one embodiment, the optical path length within, for example, optical gain element 700, e.g., for tuning or frequency modulation. Control means 1030 varies the optical pumping of optical gain element 700 for output power control and often for amplitude modulation. The transmitter intracavity loss elements are generally the same as those described for the receiver. The transmitter resonant cavity must be weakly coupled to the system waveguide to avoid coupling appreciable power from other channels. Thus, the transmitter resonator must have a high Q. Another embodiment is depicted in FIG. 14. This embodiment is identical to that depicted in FIG. 8 except that a linear, rather than a loop, resonator is used. Identical numerals represent identical elements. The end mirrors are shown as elements 11.

There are presently two classes of preferred optical gain elements. The first comprises a waveguide section containing an optically pumped lasing dopant such as neodymium, i.e., the waveguide and dopant comprise the optical gain element. Either the waveguide core or cladding or both may be doped. The system presently preferred is neodymium in glass, and the inhomogeneous broadening due to the glass spreads the multiple Nd lines to form a continuum. An exemplary Nd-doped optical fiber transmitter according to this invention is shown schematically in FIG. 9. It comprises the main resonator guide 10 coupled to the system fiber F by evanescent coupling means 20 and the three coupler Mach-Zehnder IE 700. This configuration permits the main resonator guide and IE to be made from a single fiber which can then be end-pumped by pump light source (OP) 750. End-pumping is advantageous because the pump light travels the entire length of the fiber and is therefore efficiently absorbed. Pump source 750 can be a conventional light source such as a GaAs laser or light emitting diode coupled to either the core or cladding. Tuning means 1040 controls the optical pumping level. Tuning means 1050 and 1060 tune the sections of the Mach-Zehnder IE. Tuning means 1010 tunes the main resonator as discussed.

The Nd-doped glass resonator is an intrinsically high Q laser because Nd is a four-level lasing system. Therefore, the nonexcited atoms do not absorb at the lasing frequency. This is desirable because it means that the unpumped resonator has a high Q and can be used as an optical receiver either for the transmitter frequency control routine or as a data receiver. The latter lends itself readily to transceiver embodiments in which one resonator is time shared between transmitting and receiving.

Another optical gain element comprises an organic dye in, for example, plastic.

Another optical pumping technique is prism or evanescent coupling of the pump light to the cladding. Frequency selective coupling of the pump light to the core may also be used.

Figure 10:
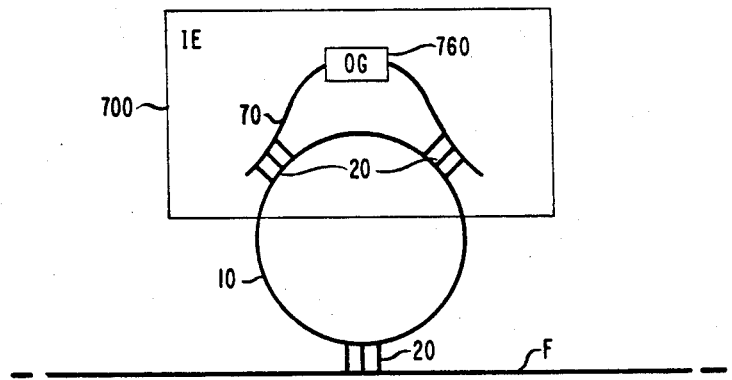

The second class of transmitter optical gain elements comprise semiconductor optical gain elements. Typically, this would be a semiconductor laser chip with antireflection coated facets so that the lasing is due to external feedback. However, because present semiconductor gain chips have both high gain and high absorption, they typically require impedance matching to the high Q main resonator. One way this may be achieved is by a modified two-coupler Mach-Zehnder IE 700 as shown in FIG. 10. This structure is analogous to the two-coupler Mach-Zehnder IE depicted in FIG. 3 except that the second waveguide 70, which is the alternative optical path, is interrupted to include the semiconductor gain element (OG) 760. The gain element is advantageously optically coupled to the fiber by lenses, as is well known to those skilled in the art.

It should also be noted that a tunable semiconductor laser can be substituted for the optical gain element if the laser is tuned to the main resonator resonance. The main resonator then provides extra feedback which narrows the semiconductor laser's linewidth. Alternatively, the tunable laser can be considered as an extra IE. This is easily understood by considering that the laser is operating below its normal threshold carrier density because of feedback from the main resonator and thus acts as a tunable narrow-band optical gain element.

Figure 11:
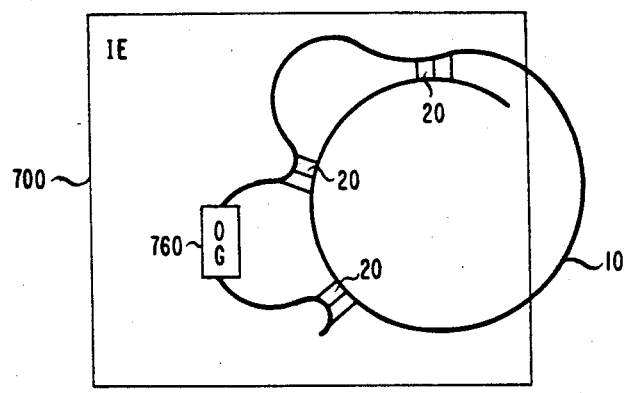

The modified three coupler Mach-Zehnder IE is illustrated in FIG. 11. This embodiment is analogous to the modified three coupler Mach-Zehnder IE depicted in FIG. 9 but one of the loops is interrupted to include an optical gain element (OG) 760. The fraction of the resonant power that is coupled to the gain element is equal to the power coupling ratio of the last IE coupler and that coupler is typically weaker than the other two IE couplers. Any Mach-Zehnder IE can be used as an optical impedance matching coupler by inserting the optical gain element in one of the loops.

A still further class of semiconductor optical gain elements comprises separate lasing and coupling resonators. The coupling resonator is weakly evanescently coupled to the system fiber and the lasing resonator is weakly coupled to the coupling resonator. Both resonators typically include monitor detectors for alignment purposes.

The two-resonator transmitter approach has several advantages. First, the lasing and coupling functions may be optimized separately. For example, a low Q lasing resonator driving a high Q coupling resonator is a form of optical impedance matching. Thus, a semiconductor gain element can be included directly in the low Q lasing resonator or alternatively, it can be impedance matched as before. Second, the lasing resonator optical gain can be turned off and the high Q coupling resonator can be used as a receiver. In the two resonator semiconductor gain element designs, turning off the semiconductor optical gain element spoils the Q of the lasing resonator thus effectively decoupling it from the coupling resonator which can then be used as a receiver. For this reason, the two resonator transmitter designs are preferred for some applications including those transceiver designs in which one resonator is time shared between transmitting and receiving.

Figure 16:
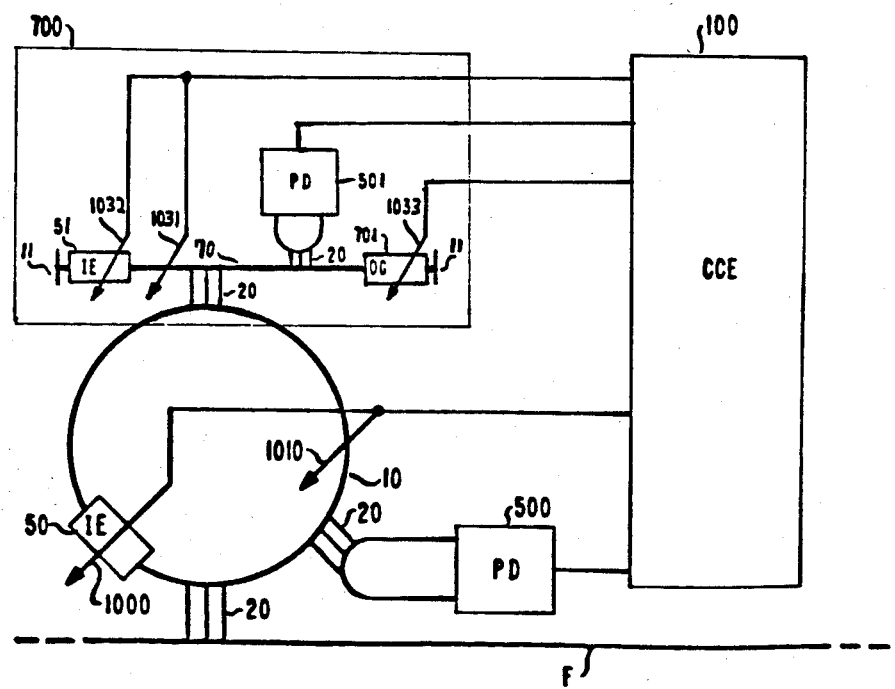
FIG. 16 is a schematic representation of a transmitter having a loop main resonator and a linear lasing resonator.

FIG. 16 shows an embodiment of a transmitter having a loop main resonator and a linear lasing resonator. The loop main resonator is essentially identical to that of FIG. 8. The lasing resonator is essentially identical to that of FIG. 14 with PD 501 corresponding to PD 500; tuning means 1031, 1032, and 1033 corresponding to means 1010, 1000, and 1030, respectively; IE 51 corresponding to IE 50; and resonator 70 corresponding to resonator 10. Identical numerals represent identical elements. The end mirrors are shown as elements 11.

Three resonator transceiver designs in which a single coupling resonator is coupled to the system fiber, a lasing resonator, and a second receiver resonator are also contemplated. The coupling resonator is time-shared between transmitting and receiving. When transmitting, the second receiver resonator is detuned to avoid coupling out the transmitter power. When receiving, the lasing resonator Q is spoiled, e.g., by turning off a semiconductor gain element or detuning.

It should be noted that any of the IEs previously discussed can be used in a multi-resonator transmitter's or transceiver's lasing resonator to select the particular resonance at which lasing takes place. Alternatively, a tunable semiconductor laser may be substituted for the optical gain element. The lasing resonator then provides extra feedback which narrows the semiconductor laser's linewidth. The tunable laser then acts as an IE and the rest of the lasing resonator can be a simple waveguide loop resonator or a linear resonator weakly coupled to the main resonator.

An additional class of two resonator transmitters may be formed by substituting a tunable laser for the photodetector in a receiver. The receiver runs backwards and couples the laser light onto the system fiber. In a typical embodiment, a second photodetector is very weakly coupled to the receiver, i.e., coupling, resonator to detect alignment. One such transmitter would comprise a linear waveguide resonator weakly evanescently coupled to the system guide and with one mirror end weakly transmitting. The tunable laser is coupled to this end and thereby to the system fiber.

Single resonator transmitter tuning is similar to the receiver tuning already described. The lasing frequency is defined by the main cavity resonance selected by the IE. As with the receiver, the frequency is servoed by tuning the main cavity resonance and servoing the IE peak to follow. As has been explained, both are tuned by varying the appropriate optical path length. The control system initiates and also optimizes and maintains the transmitter optical alignment. Initiation is by, for example, IE scanning and detection of the onset of lasing by means of the photodetector coupled to the cavity. This means servoing the IE to track the lasing resonance of the main resonator. More precisely, the alignment optimization routine then homes in on and maintains exact alignment between the IE and the lasing resonance. This is expediently performed by using the control circuit element to vary the IE tuning to maximize the ratio of the laser output to pump power. Mode step-backs are executed when necessary as described for the receiver. The transmitter control also provides means to modulate the transmitted signal to permit information to be transmitted. The modulation may be either frequency modulation or amplitude modulation. Techniques for these types of modulations are well known to those skilled in the art using the elements described, and need not be described in detail.

It should be noted that in two resonator transmitters, amplitude modulation can also be accomplished by detuning the coupling resonator for zero bits. Either the main resonator or the IE may be modulated. This technique is advantageous in that the lasing resonator need not be modulated. The technique is of most interest for electro-optically tunable integrated optic designs.

For two resonator transmitters, the lasing resonator can be initially aligned by the means described above for the single resonator transmitter. The coupling resonator can then be aligned to the lasing resonator by executing a search over the main resonator and IE free spectral ranges similar to that described for the receiver. Alternatively, the coupling resonator can be aligned first as a receiver and a search over the lasing resonator and IE free spectral range performed until lasing at the coupling resonator frequency is obtained. The advantage of the latter technique is that the transmitter can not start up on a frequency already in use.

The different transmitters should be servoed to avoid optical channel overlap and to maintain the required frequency separation. This is a systems level function, and will be described below with the systems level operations.

One exemplary embodiment of my invention is a transmission system comprising a plurality of transmitters forming a first unit near one end of the transmission fiber and a plurality of receivers forming a second unit near the other end of the transmission fiber. The first unit further comprises a control circuit element comprising a transmitter central control unit and a coupled transmitter monitor receiver. The second unit further comprises a control circuit element comprising a receiver central control unit. In operation, the transmitter central control unit scans the frequency band with the monitor receiver and issues the required corrective tuning commands to each transmitter's local control circuit or routine. At system start-up, the transmitters typically have random frequencies and the control routine sorts them by having each transmit its own "call sign." The call sign transmission also allows the receiver central control unit to scan each receiver to lock onto its designated transmitter. Once lock is achieved, it is maintained by the receiver's local control routine. Once all receivers are aligned, the receiver central control so notifies the transmitter central control via a backlink, e.g., a similar transmission system in the opposite direction, and data transmission begins.

A preferred embodiment comprises a plurality of independent transceivers, each of which can be coupled to the system fiber anywhere along its length, and each of which can tune to any other. Ideally, the transceiver's overall control system comprises frequency control means to avoid channel overlap plus link initiation means.

The first transceiver control system function is servoing the individual transmitter's frequency to avoid channel overlap. The nearest neighbor control technique, in which each transceiver responds only to the position in frequency of the two spectrally neighboring optical channels, is preferred. Such a control system first determines the relative spectral locations of the two spectrally neighboring channels, typically by turning off the transmitter optical gain element, and using the transmitter resonator as a receiver to execute a frequency scan to find the neighboring channels. The frequency scan is executed during a control interval to avoid interruption to the data transmission. The transmitter then resumes transmitting at the original frequency. A channel spacing correction function (CSCF) which may be implemented by, for example, the CCE, is then used to calculate the corrective tuning increment and the transmitter then tunes to the new frequency slowly enough to permit the receiver to which the data is being sent to follow. Thus, the tuning speed must be slower than the response rate of the receiver alignment/tracking routine. The cycle then repeats, beginning with a new scan during the next control interval.

In two resonator transmitters, the frequency scan is typically executed by the coupling resonator with the lasing resonator turned off. With single resonator semiconductor gain element transmitters, the frequency scan can be executed by the transceiver's receiver.

The nearest neighbor CSCF used in the individual transmitters must be chosen so that the string of transmitters in frequency space is stable. The presently preferred CSCFs have mechanical analogs. A simple harmonic CSCF mimics a plurality of masses coupled by springs. Any disturbance propagates down the plurality of masses (i.e., the string of channels) and is absorbed at the end mass (i.e., channel). The diffusive CSCFs mimic a plurality of massless points coupled by springs and dashpots. In a diffusive CSCF, the corrective increment is proportional to the error. A "hard shell core potential" can be added to either to avoid a tuning increment causing a channel overlap. A harmonic CSCF may also desirably comprise a damping term.

Double-sided CSCFs typically servo the transmitter frequency to the average of the nearest neighbor frequencies on both sides except for the transmitters at the ends of the string. These are servoed to the desired channel frequency spacing from their nearest neighbor. Single-sided CSCFs servo the transmitter frequency to the desired channel spacing above the low frequency neighbor. The single-sided CSCFs are preferred because the absolute channel spacing information is applied at each transceiver.

Note the CSCF typically may also comprise a small drift term adding a small step towards the peak of the gain curve to each frequency correction. The effect of this term in all the transceivers is to center the channel string under the optical gain curve peak.

A complication arises because a perfectly tuned ideal loop resonator receiver removes all of the optical power in the system guide at the channel frequency. If one of the nearest spectrally neighboring transmitters is physically on the other side of this receiver, the receiver must leave a detectable amount of optical power in the system guide for the spectrally neighboring transmitter to detect in order to servo to avoid overlap or interference with the receiver's channel. It will be readily appreciated that this is less than the power needed to recover the signal data information. This complication may be overcome by making the resonator to detector and resonator to system guide couplings unequal. Typically, a 10 percent difference will be sufficient. In practice, the two couplings typically are not exactly equal.

An alternative and preferred solution is to intentionally mistune the receiver so that it removes just enough power from the system guide to recover the signal information and leaves the rest of the power in the system guide. Preferably, the control system intentionally misaligns the receiver IE with respect to the main resonator mode to partially spoil the resonator Q. Typically, the alignment optimization/tracking routine servos the IE to produce a given photodetector output, rather than the maximum photodetector output, while continuing to servo the main resonator alignment to maximize the coupled power, i.e., photodetector output. Alternatively, the main resonator resonance may be intentionally mistuned with respect to the signal frequency or the resonator to system guide coupling reduced. The latter technique is readily realized if the coupled segment of the system guide is optically integrated with the resonator.

The just enough receiver coupling techniques discussed in the previous paragraph are also useful for link initiation and for subnetworks and broadcast mode systems. Of course, more power than the minimum needed to recover the signal may be removed by these techniques.

A second transceiver control system function is called "link" or "call" initiation. Ideally, this function should allow any transceiver to call any other. In call initiation, the transmitter of the initiating transceiver emits the call sign of the desired receiving transceiver, plus, typically, its own call sign plus any protocol bits on a prescribed link initiation frequency or frequencies. The receivers of transceivers not in use listen at the link initiation frequency or frequencies for their call signs and when a transceiver hears its own call sign, it calls the initiating transceiver. The link is then complete and the two transceivers tune off the link initiation frequency together and begin transmitting information. It should be noted that the receiver of each transceiver is frequency locked on the transmitter of the other transceiver by means of the alignment optimization/tracking routine previously discussed. Similarly, the transmitters servo to avoid overlap with other channels as previously discussed. After the transmission is completed, the receivers retune to the link initiation frequency. It should be noted that call initiation is greatly simplified in transceivers that use a common resonator for transmitting and receiving.

It is noted that the link initiation frequency can be marked by means of a control/marker transceiver emitting a distinctive call sign. Typically, the link initiation frequency is offset one channel spacing from the marker signal. Alternatively, the marker signal and the link initiation activity may be time-shared on the same frequency. Another technique places the link initiation frequency at the end of the channel string or at the peak of the optical gain curve.

If the receivers tuned to the link initiation frequency were ideal, they would each remove all of the power in the system guide at the link initiation frequency. The link initiation signal would then propagate no further than the nearest spatial neighbors on either side of the initiating transceiver. In practice, since the resonator to system and resonator to detector couplings are typically not exactly equal, one initiating transceiver can still address several listening transceivers. However, the problem may be overcome by having each transceiver listen to the call signal once and then tune off the link initiation frequency or detune its IE if it is not the transceiver addressed by the initiating transceiver. This allows the next repetition of the call signal by the initiating transceiver to propagate further down the system fiber to other transceivers. Alternatively, the transceivers can use the just enough coupling technique previously discussed to remove just enough power to recover the link initiation signal. This requires servoing anew for different initiating transmitters at different points on the system guide.

In another embodiment, each transceiver still recovers the full call signal. It thus hears the transmitted call sign, and if it is not its call sign, it repeats the call sign for the next transceiver on the line.

If a transceiver uses a common resonator for transmitting and receiving, it must be similarly time-shared during link initiation between emitting the call signal and listening for a response.

An alternative link initiation technique uses an ordered sequence of transceivers in frequency space for both link initiation and data transmission. The initiating transceiver executes a binary chop search for the desired receiving transceiver. Alternatively, it may execute a linear search or simply count channels. Typically, to facilitate these searches, transceivers not in use almost continuously transmit their call signs and transceivers in use transmit their call signs during control intervals. Just enough coupling enables the searching or initiating transceiver to listen for another transceiver's call sign without disrupting a transmission in progress.

A still further embodiment uses a coupling technique, e.g., just enough coupling, that allows one transmitter to broadcast to many receivers, e.g., for a cable TV system or for a subnetwork feature in which several transceivers share a common optical frequency and take turns passing data. Each receiver extracts sufficient optical power to recover the signal information. Such a subnetwork can be created at any time out of any subset of the system's transceivers by modifying the link initiation procedure to allow an initiating transceiver to call many responding transceivers.

For the cable TV feature, each listener's transceiver may search for an optical transmitter emitting the desired station's call signs. Typically, the cable TV transceivers would be placed together on a particular frequency subband.

Frequency multiplexed subnetworks are also contemplated. Typically, the initiating transceiver would assemble the desired collection of transceivers which would then arrange themselves on neighboring channel frequencies. Any transceiver may then transmit data into any other transceiver by tuning to the other transceiver's frequency. Typically, only the main resonator need be tuned to do this. The IE alignment typically would be satisfactory over the vary narrow bandwidth occupied by the subnetwork.

Any optical transmitter can tune only over the optical bandwidth of its optical gain element. If the different transmitters all use the same optical gain medium, the multiplexing system bandwidth is restricted to the bandwidth of the optical gain peak of the medium. However, this still permits many optical channels because the bandwidth per channel is very narrow. Alternatively, in multiband multiplexing systems, different transmitters can have different gain element compositions and therefore different frequency bands. Typically, a single subset of the transmitters has one gain element composition and one operating band and a second subset has a second gain element composition and a second operating band, etc. It will be readily appreciated that these bands may overlap. The total optical bandwidth of the multiplexing system then covers all the transmitter bandwidths and the number of channels is correspondingly increased. The receiver tuning ranges are not restricted by any optical gain elements. Thus, any two transceivers can form a link because the receiver of each can be tuned to the transmitter of the other even if their two transmitters do not operate in the same frequency band.

It should be noted that these multiband multiplexing systems require several link initiation frequencies as there typically is no common link initiation frequency to which all transceivers' transmitters may be tuned. As previously mentioned, the receivers of the transceivers not in use can scan the different link initiation frequencies and listen for a call initiation signal addressed to them. Alternatively, a central control unit comprising transceivers tuned to each link initiation frequency can relay the link initiation signal to the link initiation frequency of the receiving transceiver. The receiving transceiver's receiver can then tune to the link initiation frequency of the initiating transceiver and lock onto the initiating transceiver. Similarly, the initiating transceiver's receiver can tune to the link initiation frequency of the receiving transceiver and lock onto the latter's transmitter.

In single resonator transceivers or single coupling resonator receivers, the common resonator would be time-shared between transmitting and receiving as previously discussed and thus between the transmitting and receiving frequencies in multiband systems.

In a single branch loop network, a single system fiber runs past all of the transceivers. A star network comprises a plurality of system fiber branches joined at a central hub. The central hub may be a simple optical power splitter which divides the incident optical signals from each branch among all the others. Alternatively, the central hub may comprise a broadband wavelength multiplexer. Grating or prism multiplexers are presently preferred. A transfer between any specified pair of optical fiber branches has a specific optical bandwidth. If the transceiver on one branch desires to communicate with the transceiver on another branch, it emits within the corresponding optical transfer bandwidth.

Tree networks may be implemented by analogous methods. Each branch is joined to the network by a hub. The star is a special case of the tree network with only a single hub.

System fiber loops, i.e., networks, can be single branches, stars, or trees, etc. They typically are not closed. In this connection, a system "loop" can refer to "loop plant," i.e., to the subscriber network, or, more generally, to any system network including a subscriber's private network or a network in a switching system.

Hierarchical network systems are also contemplated. For example, a network system may comprise subnetworks or loops that are conveniently termed local, regional and national. These loops may be termed levels 1, 2 and 3, respectively. Several regional loops are connected to the national loop and several local loops are connected to each regional loop. At connections between loops, there are stations that are conveniently termed loop intersection stations. These comprise multiple transceivers on each loop so that optical signals on one loop can be repeated on another although not necessarily at the same frequency.

A station, typically comprising a transceiver, on a first local loop calls a station on a second local loop by transmitting a call signal which typically includes the call signs of the first local loop-regional loop intersection station, the second local loop-regional loop intersection station, and that of the desired transceiver. The first local loop intersection station detects its call sign, links one of its transceivers on the first local loop with the calling station using the link initiation procedures previously discussed and then uses one of its transceivers on the regional loop to retransmit the call signal. The second local loop's intersection station then detects its call sign, links one of its transceivers on the regional loop with the calling transceiver from the first intersection station, and uses one of its transceivers on the second loop to retransmit the call signal. The called station on the second loop detects its call signal, as previously discussed, and the link is formed.

Figure 17:
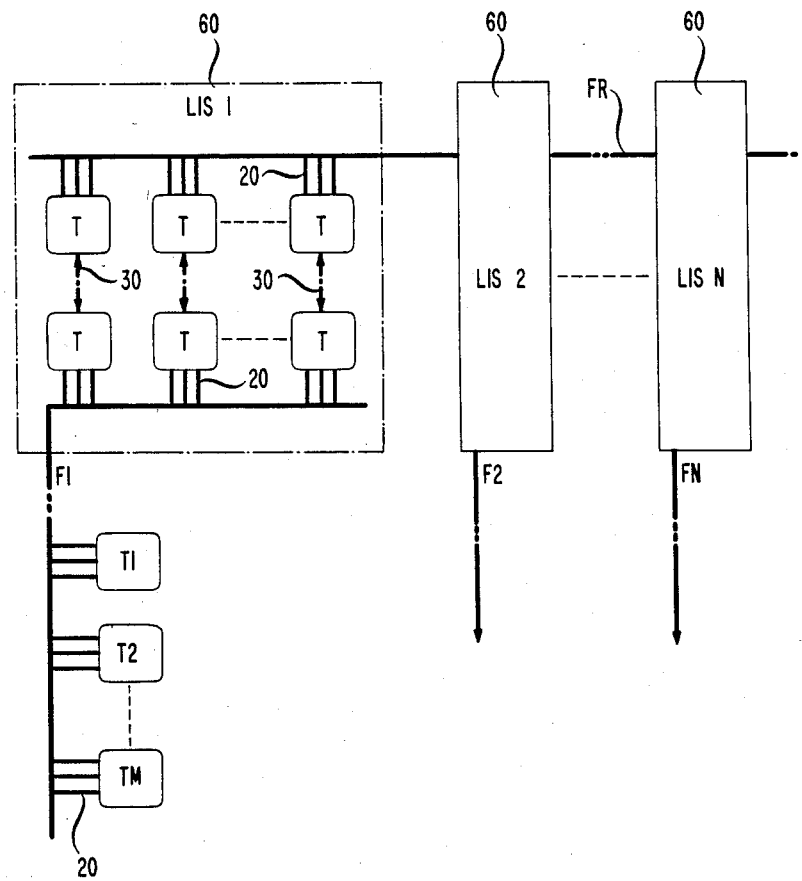
FIG. 17 is a schematic representation of an optical communications system according to this invention.

FIG. 17 shows an exemplary communications system comprising a plurality of local loops connected to a regional loop by means of loop intersection stations. The local loop fibers are denoted by F1, F2, ... FN, the loop intersection stations 60 are denoted by LIS 1, LIS 2, ... LIS N, the regional loop fiber is denoted by FR, and may be connected to a "national" loop by means of yet another loop intersection station (not shown). Also depicted are optical transceivers T1, T2, ... TM1 on local loop 1. Evanescent coupling is shown as 20. The connections between the LIS transceivers on F1 and FR are shown as 30.

If the second local loop is not connected to the same regional loop as the first local loop, the initiation procedure described is modified to include the national loop. Two loop intersection stations on the national loop will be used, the first regional loop—national loop and the second regional loop—national loop intersection stations, respectively. The call signal transmitted by the first local station will then typically include the call signs of these regional to national loop intersection stations as well.

Alternatively, the call signs of the intermediate loop intersection stations can be generated from the called station's call sign at the first loop intersection station. Another alternative uses a signal routing function distributed among the intersection stations along the signal path.

It will be readily appreciated by those skilled in the art that as information is transferred from one loop to another that the optical frequency may change. It will be further appreciated that although the system was described in terms of a three level loop hierarchy, the system may have a two level hierarchy or a four or more level hierarchy. Additionally, bit rates may also change as information is transferred from one loop to another. A loop intersection station from a low bit rate loop to a higher bit rate loop would then comprise time division multiplexing/demultiplexing means to multiplex the larger number of transceivers on the former to the smaller number on the latter. For example, several transmissions on a lower bit rate local loop to be transmitted through the regional loop to the same second local loop would be combined and transmitted by a single higher bit rate transceiver on the regional loop. The several transmissions would typically be brought to the same time division multiplexer/demultiplexer by electronic switching means.

It will be further appreciated that higher order loops may use multiple fibers or waveguides for greater capacity and each loop intersection station would then have transceivers on each fiber in the resulting bundle, and typically would comprise electronic switching means to allocate calls among the bundle.

Loop intersection stations connecting three or more loops are also contemplated. These will comprise transceivers on each of the several loops as well as, typically, an electronic switcher to route calls between transceivers on different loops. These higher order loop intersection stations can also be used for central office switches or for network hubs.

Each level loop may also comprise a loop control system which may be integrated with the intersection station to the next higher order loop. As mentioned, this loop control station may comprise link initiation frequency marker transmitters and/or call initiation signal relay transceivers. Additionally, it may comprise monitor transceivers tuned to the link initiation frequencies to listen to the call initiation signals to keep track of the calls made and their durations for billing purposes. Then, typically, each transceiver would transmit a call termination signal comprising its call sign on the link initiation frequency at the end of each call. This would also enable the central station to know which transceivers are in use at any moment and thus send a busy signal to any transceiver attempting to link to a transceiver in use. Automatic callback is also readily implemented by the control system signaling both transceivers when the previous call is completed.

These higher order loops are also ideally suited for central office use as optical switching systems or as network hubs. The incoming fibers would typically be carrying multiplexed signals. Each fiber would be connected to a loop intersection station to interface to a loop in the switcher. The loop control system in a switcher would typically also comprise testing means which would periodically check each of the individual transceivers in the loop intersection stations and, typically, the user's transceivers out in the network. Part of this testing function would typically be delegated to the control circuit elements of the individual transceivers.

Finally, the optical transmitters described are ideal narrow-linewidth single-frequency lasers and can be used as such in many optics applications. For example, such a transmitter is preferred local oscillator for heterodyne optical receivers. Typically, it would be evanescently coupled to a fiber or a waveguide carrying the received optical signal and would be readily servoed to the same frequency as the incoming signal by means previously discussed.

What is claimed is:

1. A wavelength division multiplexing optical communications system comprising an optical waveguide and a device comprising a waveguide resonator; a photodetector; said resonator being optically evanescently coupled to said optical waveguide and optically coupled to said photodetector; an intracavity element optically coupled to said resonator; and a control circuit element to tune said resonator to a desired frequency.

2. A system as recited in claim 1 in which said resonator comprises a linear Fabry-Perot cavity.

3. A system as recited in claim 2 in which said control circuit element comprises means to vary the optical length of said resonator.

4. A system as recited in claim 3 in which said means uses the electro-optic effect.

5. A system as recited in claim 3 in which said means uses mechanical strain.

6. A system as recited in claim 1 in which said resonator comprises a loop Fabry-Perot cavity.

7. A system as recited in claim 6 in which said control circuit element comprises means to vary the optical length of said resonator.

8. A system as recited in claim 7 in which said means uses the electro-optic effect.

9. A system as recited in claim 7 in which said means uses mechanical strain.

10. A system as recited in claim 1 in which said resonator comprises a pillbox optical cavity.

11. A system as recited in claim 1 in which said control circuit element comprises means to vary the optical length of said resonator.

12. A communications system as recited in claim 1 in which said control circuit element comprises means to tune said intracavity element by varying an optical path length in said intracavity element.

13. A communications systems as recited in claim 12 in which said intracavity element comprises a loop Fabry-Perot resonator.

14. A communications system as recited in claim 12 in which said intracavity element comprises a linear Fabry-Perot resonator.

15. A communications system as recited in claim 12 in which said intracavity element comprises a tunable interferometer.

16. A system as recited in claim 15 in which said interferometer comprises a two-coupler Mach-Zehnder waveguide interferometer.

17. A system as recited in claim 15 in which said interferometer comprises a three-coupler Mach-Zehnder waveguide interferometer.

18. A communications system as recited in claim 12 in which said intracavity element comprises an evanescent coupler.

19. A system as recited in claim 12 in which said intracavity element comprises a pillbox cavity resonator.

20. A system as recited in claim 12 in which said intracavity element comprises a grating-assisted evanescent coupler.

21. A communications system as described in claim 12 in which said control circuit element comprises means to tune said intracavity element and said waveguide resonator to a common frequency.

22. A communications system as described in claim 20 wherein said control circuit element comprises means to execute mode stepbacks of the waveguide resonator.

23. A communications system as described in claim 20 in which said control circuit element comprises means to execute mode stepbacks of said intracavity element.

24. A communications system as described in claim 23 further comprising means to create control intervals, data not being transmitted during control intervals.

25. A communications system as recited in claim 24 in which said control circuit element comprises means to maintain optical alignment with a received optical signal.

26. A communications system as recited in claim 1 in which said resonator further comprises an optical gain element thereby forming a transmitter when activated.

27. A communications system as recited in claim 26 in which said optical gain element comprises an optically pumped lasing dopant.

28. A communications system as recited in claim 27 in which said dopant comprises neodymium.

29. A communications system as recited in claim 27 in which said dopant comprises an organic dye.

30. A communications system as recited in claim 26 in which said optical gain element comprises an optical gain medium.

31. A communications systems as recited in claim 30 in which said optical gain medium comprises a semiconductor.

32. A communications system as recited in claim 26 in which said optical gain element comprises a semiconductor.

33. A system as recited in claim 1 or 21 further comprising a plurality of said devices.

34. A system as recited in claim 33 comprising at least two of said pluralities, said first plurality being at a first location and said second plurality being at a second location.

35. A system as recited in claim 33 in which said control circuit element of at least one of said devices comprises means to tune said intracavity element and said waveguide resonator to a common frequency.

36. A system as recited in claim 35 in which said resonator of at least one of said devices further comprises an optical gain element whereby forming a transmitter when activated and said control circuit element further comprises means to servo said transmitter.

37. A system as recited in claim 33 further comprising a second optical waveguide; at least one of said devices being coupled to said first waveguide and at least one of said devices being optically coupled to said second waveguide; at least one of said devices coupled to said first waveguide being connected to at least one of said devices optically coupled to said second waveguide.

38. A system as recited in claim 33 in which said devices of said plurality are at different locations.

39. A communications system as recited in claim 38 in which said control circuit element comprises link initiation means.

40. A communications system as recited in claim 39 wherein said link initiation means comprises a call signal, said signal further comprising the identification code of said device.

41. A communications system as recited in claim 40 further comprising a common link initiation frequency to which said devices not in use are tuned.

42. A communications system as recited in claim 38 in which said control circuit element further comprises search means.

43. A communications system as recited in claim 42 in which said control circuit element comprises link initiation means.

44. A communications system as recited in claim 15 in which said tunable interferometer comprises an optical gain element.

45. A communications system as recited in claim 1 further comprising a second resonator evanescently optically coupled to said waveguide resonator.

46. A system as recited in claim 45 in which said second resonator comprises an optical gain element.

47. A device comprising a waveguide resonator; a photodetector; said resonator adapted to be evanescently coupled to an optical waveguide and optically coupled to said photodetector; an intracavity element optically coupled to said resonator; and a control circuit element to tune said resonator to a desired frequency.

48. A device as recited in claim 47 in which said resonator comprises a linear Fabry-Perot cavity.

49. A device as recited in claim 48 in which said control circuit element comprises means to vary the optical length of said resonator.

50. A device as recited in claim 47 in which said resonator comprises a loop Fabry-Perot cavity.

51. A device as recited in claim 50 in which said control circuit element comprises means to vary the optical length of said resonator.

52. A device as recited in claim 51 in which said means uses the electro-optic effect.

53. A device as recited in claim 51 in which said means uses mechanical strain.

54. A device as recited in claim 47 in which said resonator comprises a pillbox optical cavity.

55. A device as recited in claim 54 in which said control circuit element comprises means to vary the optical length of said resonator.

56. A device as recited in claim 47 in which said control circuit element comprises means to tune said intracavity element by varying an optical path length in said intracavity element.

57. A device as recited in claim 56 in which said intracavity element comprises an evanescent coupler.

58. A device as recited in claim 56 in which said intracavity element comprises a loop Fabry-Perot resonator.

59. A device as recited in claim 56 in which said intracavity element comprises a pillbox cavity resonator.

60. A device as recited in claim 56 in which said intracavity element comprises a linear Fabry-Perot resonator.

61. A device as recited in claim 56 in which said intracavity element comprises a tunable interferometer.

62. A device as recited in claim 61 in which said tunable interferometer comprises a two-coupler Mach-Zehnder waveguide interferometer.

63. A device as recited in claim 61 in which said interferometer comprises a three-coupler Mach-Zehnder waveguide interferometer.

64. A device as recited in claim 47 in which said intracavity element comprises a grating assisted evanescent coupler.

65. A device as recited in claim 64 in which said control circuit element comprises means to tune said evanescent coupler by varying an optical path length.

66. A device as recited in claim 64 in which said control circuit element comprises means to tune said evanescent coupler by varying an optical grating period.

67. A device as recited in claim 56 in which said intracavity element further comprises an optical gain element.

68. A device as recited in claim 47 in which said resonator further comprises an optical gain element.

69. A device as recited in claim 68 in which said optical gain element comprises an optically pumped lasing dopant.

70. A device as recited in claim 69 in which said dopant comprises neodymium.

71. A device as recited in claim 69 in which said dopant comprises an organic dye.

72. A device as recited in claim 69 in which said optical gain element comprises an optical gain medium.

73. A device as recited in claim 72 in which said optical gain medium comprises a semiconductor.

74. A device as recited in claim 68 in which said optical gain element comprises a semiconductor.

75. A device as recited in claim 56 in which said control circuit element comprises means to tune said intracavity element and said waveguide resonator to a common frequency.

76. A device as recited in claim 75 wherein said control circuit element comprises means to execute mode stepbacks of the waveguide resonator.

77. A device as recited in claim 76 in which said control circuit element comprises means to execute mode stepbacks of said intracavity element.

78. A device as recited in claim 77 further comprising means to create control intervals.

79. A device as recited in claim 47 further comprising a second photodetector; a second resonator adapted to be evanescently coupled to an optical waveguide and optically coupled to said second photodetector; a second intracavity element optically coupled to said second resonator; and a second control circuit element to tune said second resonator to a desired frequency.

80. A device as recited in claim 79 in which said first and second intracavity elements tune said first and second resonators to first and second desired frequencies, respectively.

81. A device as recited in claim 79 in which said first and second resonators are adapted to be coupled to first and second optical waveguides, respectively.

82. A device as recited in claim 47 further comprising a second device, said second device as recited in claim 47 being optically coupled to said first device.

83. A device as recited in claim 82 in which said waveguide resonator of said second device further comprises an optical gain element.

84. A device as recited in claim 79 in which said second resonator comprises an optical gain element.

85. A device as recited in claim 79 in which said second intracavity element comprises an optical gain element.

86. A device as recited in claim 79 further comprising a third resonator evanescently coupled to one of said first and second resonators.

87. A device as recited in claim 86 in which said third resonator further comprises an intracavity element.

88. A device as recited in claim 86 further comprising means to tune said third resonator.

89. A loop intersection station comprising a plurality of devices as recited in claim 81.

90. A device as recited in claim 79 in which said second resonator is optically coupled to said first resonator.

91. A optical switching system comprising a plurality of devices as recited in claim 47.

92. An optical switching system comprising a plurality of devices as recited in claim 79.

* * * * *